United States Patent [19]

Bruni

[11] 4,314,531

[45] Feb. 9, 1982

[54] PISTONS AND CYLINDER LINERS

[75] Inventor: Ludovico Bruni, Turin, Italy

[73] Assignee: Associated Engineering Italy S.p.A., Turin, Italy

[21] Appl. No.: 133,527

[22] Filed: Mar. 24, 1980

[30] Foreign Application Priority Data

Nov. 13, 1979 [GB] United Kingdom ............... 39294/79

[51] Int. Cl.³ ................................................ F02F 3/04
[52] U.S. Cl. ............................... 123/193 CP; 75/142; 92/169; 92/227; 92/228; 123/193P
[58] Field of Search .................. 428/653, 654; 75/148, 75/142; 92/169, 172, 227, 228; 123/193 CP, 193 P

[56] References Cited

U.S. PATENT DOCUMENTS 4,068,645 1/1978 Jenkinson .............................. 75/148

Primary Examiner—R. Dean
Attorney, Agent, or Firm—Leydig, Voit, Osann, Mayer & Holt, Ltd.

[57] ABSTRACT

A piston mainly composed of an aluminium alloy for use in a cylinder of aluminium alloy. The piston is provided with one or more inserts of ferritic steel. The insert or inserts extend across opposed thrust faces of the piston and form part of the running surface of the piston skirt.

7 Claims, 3 Drawing Figures

PISTONS AND CYLINDER LINERS

BACKGROUND OF THE INVENTION

1. Field of the Invention

This invention relates to pistons and cylinder liners for use in reciprocating engines and compressors.

2. Description of the Prior Art

Reciprocating internal combustion engines have been almost universally used in road vehicles since before 1900, and it has been the practice to use aluminum alloy pistons in cast-iron cylinders or cylinder liners. Steel inserts in aluminium alloy pistons first came into use in the Nelson Bohnalite piston of 1927, and were also used in the pistons of the Junkers Jumo 203 engine of 1930; similar inserts were employed in the Mahle Autothermic design of piston of 1935, and various manufacturers have employed steel inserts in aluminium alloy pistons from then until the present day. The purpose of these inserts is to modify the thermal expansion characteristics of the piston, and the running surface of the skirt of all such pistons that were successfully used was of aluminium alloy, the cylinder bore being of cast iron. Examples of aluminium alloy pistons having steel inserts for the control of thermal expansion may be found in British Pat. Nos. 701,291, 1,134,245 and 1,394,830.

More recently, aluminium alloy cylinder blocks have been introduced, and where aluminium alloy pistons are to be used in aluminium alloy cylinders, one of several choices is employed. Either one of the surfaces (i.e. the piston skirt or the bore) is coated, for example by electroplating with chromium or another coating compatible in operation with a co-operating aluminium alloy surface; or a special aluminium alloy, e.g. one treated with graphite, is employed for the cylinder; the latter is significantly more expensive than the more usual aluminium silicon alloys; or in a further example, a special etching treatment is used on the cylinder wall, but this is not altogether satisfactory under low temperature conditions, such as when starting the engine in cold weather.

BRIEF SUMMARY OF THE INVENTION

The present invention overcomes, in a novel manner, the problem of running a piston mainly composed of aluminium alloy in a cylinder of aluminium alloy, for example, of hyper-eutectic aluminium silicon alloy.

According to this invention in one aspect, there is provided a piston mainly composed of aluminium alloy for use in a cylinder of aluminium alloy, the piston comprising at least one insert of ferritic steel, at least a portion of the insert forming a part of the running surface of the skirt of the piston.

The ferritic steel insert or inserts may take any of the known forms of insert which extend across the opposed thrust faces of the piston. The thrust faces of the piston are those faces located on either side of the axis of the gudgeon pin of the piston and which bear the thrust of the piston. However, hitherto the insert lay radially within a band of aluminium alloy on the thrust face whereas in the present invention the ferritic steel insert forms part of the running surface of the piston skirt. For example, inserts of the general form shown in FIGS. 3 and 4 of British Pat. No. 1,394,830 would be suitable (though with part 18 modified to form part of the running surface of the piston) for the present invention, as would inserts of the type described in British Pat. No. 1,134,245.

According to this invention in another aspect, there is provided a cylinder and piston system comprising a cylinder having an untreated cylinder wall (as herein defined) of aluminium alloy and an aluminium alloy piston, the piston having at least one ferritic steel insert, the insert or inserts extending across one or both of the opposed thrust faces of the piston and forming, at least at the upper end of the piston skirt, a portion of the running surface of the skirt which, in operation, co-operates with said cylinder wall.

According to yet another aspect of the present invention there is provided an internal combustion engine comprising a cylinder having a cylinder wall of an aluminium alloy and a piston mainly composed of an aluminium alloy, the piston having at least one insert of ferritic steel, at least a portion of the insert forming part of at least one running surface of the skirt of the piston.

As used herein, the term cylinder of aluminium alloy refers to a cylinder formed in an aluminium alloy cylinder block or a cylinder defined by an aluminium alloy sleeve or liner.

By an untreated cylinder wall in this specification is meant a cylinder wall formed in an aluminium alloy, which wall has not been electrolytically plated or otherwise coated with another material, and which aluminium alloy has not been specially treated to produce a surface layer especially suitable for running against an aluminium alloy piston in operation in a reciprocating engine or reciprocating compressor.

Preferably the aluminium alloy of the cylinder is a hyper-eutectic aluminium silicon alloy.

Although primarily directed to internal combustion engines, the present invention may be used in external combustion (Stirling cycle) reciprocating engines and in reciprocating compressors.

One surprising aspect of the invention is that it is not necessary that the whole of the piston skirt and lands on the thrust faces should be formed by the insert(s), but tests have shown that only a relatively small area, near the top of the skirt, need be so formed.

DETAILED DESCRIPTION OF A PREFERRED EMBODIMENT

Figure 1:
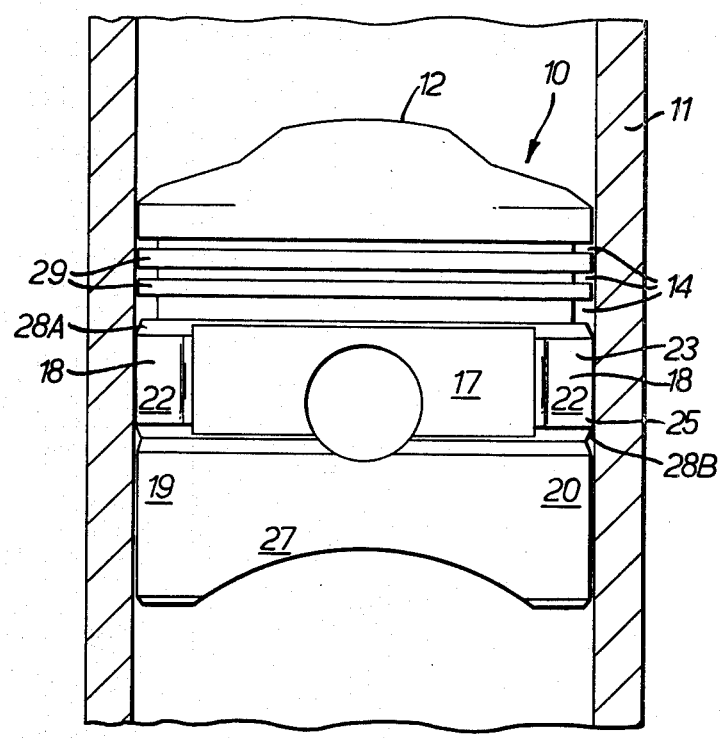
FIG. 1 is an external view of a piston according to the invention, showing part of the co-operating cylinder.

Referring first to FIG. 1, the piston 10 is shown mounted in a cylinder 11, the piston rings having been omitted so as more clearly to show the form of the piston.

Figure 2:
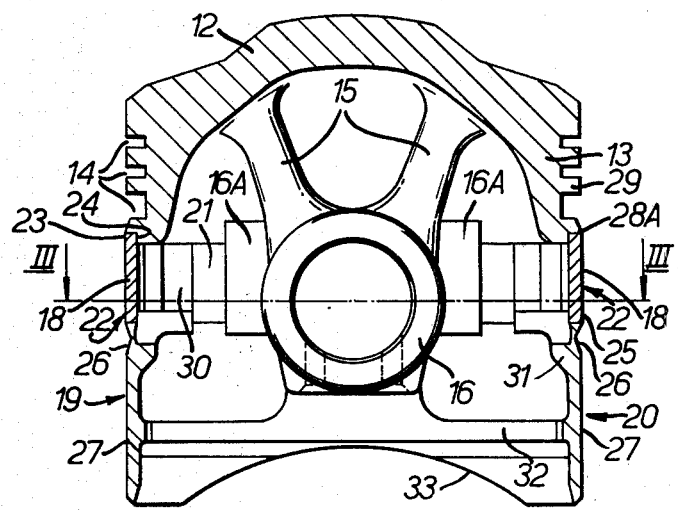
FIG. 2 is a longitudinal cross-section of the piston of FIG. 1, on the line II—II of FIG. 3.
Figure 3:
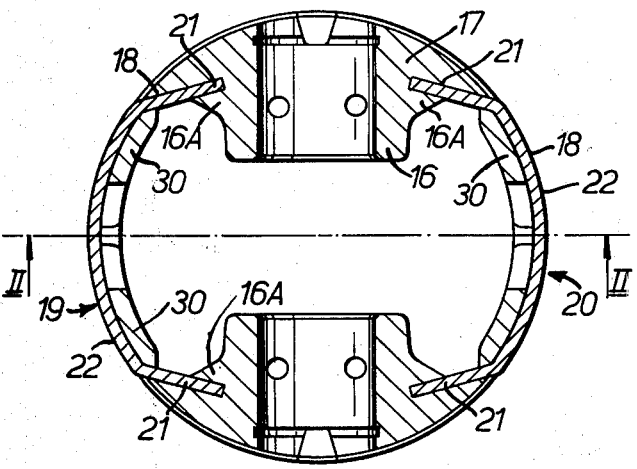
FIG. 3 is a transverse cross-section on the line III—III of FIG. 2.

With reference to FIGS. 1–3, the piston has a crown 12 with which is integral a substantially cylindrical ring band 13 in which piston ring grooves 14 are formed. Diagonal webs 15 join the two gudgeon pin bosses 16 to the crown 12, and parts 17 of the piston skirt extend circumferentially from the bosses 16. The piston includes a pair of ferritic steel inserts 18, which are arcuate over a major part of their cross section and extend across the two opposed thrust faces 19, 20 of the piston. The two ends 21 of each insert being embedded in the respective sides of the gudgeon pin bosses 16, which are formed with fillets 16A. Over a substantial cicumferential part of each thrust face 19, 20 of the piston, and at the upper end of the skirt (i.e. the end nearer to the crown), the inserts form parts 22 of the running surface of the skirt and, in operation, co-operate with the bore of cylinder 11. The upper edge 23 of each insert 18 is received in a rebate 24 at the base of the ring band 13 over the part 22 which forms part of the running surface, and its lower edge 25 abuts the upper edge 26 of a lower part 27 of the skirt.

The parts 22 of the two inserts 18 which form the running surface are rounded off or chamfered at their upper and lower edges 23, 25, so as to form slight recesses 28A, 28B, and are so dimensioned that, at their operating temperature in the engine, a diameter measured across the inserts 18 is slightly greater than the corresponding diameter measured across the lands 29 between the ring grooves 14.

The upper edge 26 of the lower part 27 of the piston skirt is also chamfered, so that the recess 28B is obtuse-angled, around the thrust faces 19, 20 of the piston. Moreover, it is found that the lower part 27 of the skirt, on the thrust faces 19, 20, can be made almost cylindrical and of the same diameter as the exposed parts 22 of the inserts 18. It will be appreciated that the lower part 27 of the skirt, although having a higher coefficient of thermal expansion than the inserts 18, is substantially cooler than the latter. Generally axially-extending sections of aluminium 30 may link the lower part 27 of the piston skirt with the ring band 13, within the circumferentially-extending portions 22 of the inserts 16.

Moreover, the piston may be formed with circumferential ribs 31, 32, both near the upper edge 26 of the lower part of the skirt, and near the open end 33 of the skirt, together with other known or convenient features.

The piston may be made of any known or convenient aluminium alloy, as may the cylinder. The hyper-eutectic aluminium alloy normally used both for pistons and cylinders has a composition falling within the following range, the exact composition depending on the application; the values are percentage by weight;

Si: 12–19
Cu: 0.5–6
Ni: 0.5–3
Mg: 0.2–2
Fe: 0.1–1
Ti: 0.05–0.2
Mn: 0.01–0.5
Al: Remainder Various modifications are possible within the scope of the invention; for example, there may be a single insert of elliptical or oval shape, which forms parts of the running surface.

I claim:

1. An internal combustion engine comprising a cylinder having an untreated cylinder wall of an aluminum alloy and a piston mainly composed of an aluminum alloy, the piston comprising a crown, a ring band integral with the crown and having grooves therein for the reception of piston rings, a skirt integral at its upper end with the ring band and having a running surface having opposed portions which form opposed thrust faces for engagement under pressure with the wall of the cylinder, and at least one expansion-control insert of ferritic steel, the insert being mounted in the skirt, a portion of the insert forming a portion of the running surface of the skirt of the piston, said portion of the insert being confined to an upper portion of the skirt and within the opposed thrust faces of the piston.

2. An internal combustion engine according to claim 1 wherein the cylinder wall is made of a hyper-eutectic aluminum silicon alloy.

3. A piston mainly composed of aluminium alloy for use in a cylinder having a cylinder wall of aluminium alloy, the piston comprising a crown, a ring band integral with the crown and having grooves therein for the reception of piston rings, a skirt integral at its upper end with the ring band and having a running surface having opposed portions which form opposed thrust faces for engagement under pressure with the wall of the cylinder, and at least one expansion-control insert of ferritic steel, the insert being mounted in said skirt, a portion of the insert forming a portion of the running surface of the skirt of the piston, said portion of the insert being confined to an upper portion of the skirt and within said opposed thrust faces.

4. A piston according to claim 3, wherein the piston is mainly composed of a hyper-eutectic aluminium silicon alloy.

5. A piston according to claim 3, having a single said insert extending across both thrust faces of the piston, the insert being of oval or elliptical shape.

6. A piston according to claim 3 wherein the upper and lower edges of the portion or portions of the insert forming part of the running surface of the piston skirt are rounded or chamfered to form recesses in the piston surface.

7. A piston according to claim 6 wherein the edge of the piston skirt adjacent the lower edge of the insert is chamfered such that the two edges in combination define an obtuse angled recess.

* * * * *